(12) United States Patent
Taylor et al.

(10) Patent No.: US 11,174,005 B2
(45) Date of Patent: Nov. 16, 2021

(54) AIRCRAFT CONTROL SYSTEMS

(71) Applicant: BAE SYSTEMS plc, London (GB)

(72) Inventors: Adam Taylor, Rochester (GB); Jonathan David Draper, Rochester (GB)

(73) Assignee: BAE SYSTEMS plc, London (GB)

(*) Notice: Subject to any disclaimer, the term of this patent is extended or adjusted under 35 U.S.C. 154(b) by 0 days.

(21) Appl. No.: 16/771,315

(22) PCT Filed: Nov. 29, 2018

(86) PCT No.: PCT/GB2018/053448
§ 371 (c)(1),
(2) Date: Jun. 10, 2020

(87) PCT Pub. No.: WO2019/122807
PCT Pub. Date: Jun. 27, 2019

(65) Prior Publication Data
US 2020/0339246 A1 Oct. 29, 2020

(30) Foreign Application Priority Data

Dec. 21, 2017 (GB) .................................. 1721529
Jan. 16, 2018 (EP) .................................. 18151965

(51) Int. Cl.
B64C 13/04 (2006.01)
B64C 25/50 (2006.01)

(52) U.S. Cl.
CPC .......... B64C 13/0421 (2018.01); B64C 25/50 (2013.01)

(58) Field of Classification Search
CPC ..... B64C 13/0421; B64C 13/12; B64C 13/46; B64C 25/50; B64C 19/02
See application file for complete search history.

(56) References Cited

U.S. PATENT DOCUMENTS

| 2,621,002 | A | | 12/1952 | Pillmnan |
| 4,188,834 | A | | 2/1980 | Wakatsuki et al. |
| 4,420,808 | A | | 12/1983 | Diamond et al. |
| 5,008,825 | A | * | 4/1991 | Nadkarni ............. G05D 1/0083 244/178 |
| 2003/0125848 | A1 | | 7/2003 | Otake et al. |

(Continued)

FOREIGN PATENT DOCUMENTS

| EP | 2072395 A2 | 6/2009 |
| GB | 2471213 A | 12/2010 |
| WO | 2019122807 A1 | 6/2019 |

OTHER PUBLICATIONS

International Preliminary Report on Patentability received for PCT Application No. PCT/GB2018/053448. dated Jul. 2, 2020. 9 pages.

(Continued)

Primary Examiner — Rodney A Bonnette
(74) Attorney, Agent, or Firm — Finch & Maloney PLLC

(57) ABSTRACT

Aircraft control systems to enable shared input controls. A single inceptor may provide outputs to control both land-based aircraft controls and air-based aircraft controls to reduce the number of inceptors required. In an example a side-stick provides control of both pitch and aircraft nose-wheel steering. Active inceptor technology may be utilised to provide feedback to the operator on the control system state.

19 Claims, 3 Drawing Sheets

(56) References Cited

U.S. PATENT DOCUMENTS

2009/0187292 A1    7/2009  Hreha et al.
2013/0126666 A1*   5/2013  Brown ...................... B60F 5/02
                                                           244/2
2013/0138274 A1    5/2013  Caldeira et al.

OTHER PUBLICATIONS

International Search Report and Written Opinion received for PCT Application No. PCT/GB2018/053448. dated Feb. 1, 2019. 15 pages.
GB Search Report under Section 17(5) received for GB Application No. 1721529.4 dated Jun. 18, 2018. 4 pages.
Extended European Search Report received for EP Application No. 18151965.3, dated Jul. 4, 2018. 7 pages.

* cited by examiner

AIRCRAFT CONTROL SYSTEMS

This disclosure relates to control systems for aircraft, and in particular control systems with dynamic functionality.

Aircraft have a wide range of control systems utilised to convey operator instructions to aircraft control systems. Flight controls are one set of such control systems which enable the operator to control aspects of the aircraft during movement (in the air or on the ground). Particular examples of flight control systems are those for controlling the pitch, roll, and yaw of the aircraft while in the air or on the ground.

In a typical aircraft pitch and roll are controlled by a stick or yoke held by the operator. Aircraft controls are commonly known as inceptors. A particular example of an inceptor is a side-stick positioned to the side of the operator which has 2 dimensions of movement (forwards/backwards and left/right), one for each of the pitch and roll. Yaw of an aircraft while in the air (and while moving at speed on the ground) is by control of the rudder which is typically controlled by rudder pedals controlled by the user's feet. Ailerons, elevators, and the rudder are examples of aerodynamic control surfaces which control the aircraft by interaction with airflow over the aircraft.

On the ground aircraft are controlled using nose-wheel steering and wheel brakes. Nose-wheel steering is typically controlled using a tiller control, and brakes are controlled either by distinct pedals, or by pressing brakes regions of the rudder pedal.

In a conventional system each control aspect thus has an individual input control, despite only subsets of the controls being in use at any one time. Such multiple systems increase cost and complexity, but the characteristics and requirements of each system are very different.

There is therefore a requirement for aircraft control systems which reduce complexity and cost.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a control system for controlling an aircraft, comprising an inceptor; and a processing system having a first input configured to receive inputs indicative of movement of the inceptor in a first axis, and at least first and second outputs, each output being for controlling different aspects of an aircraft; wherein, in a first state, the processing system is configured to control only the first output based on the first input, and in a second state the processing system is configured to control only the second output based on the first input.

The inceptor may be an active inceptor device, the processing system being configured to control movement resistance of the inceptor, wherein the movement resistance is dependent on at least the state of the processing system.

The first output may control aerodynamic control surfaces of the aircraft, and the second output controls nose-wheel steering of the aircraft.

The inceptor may be a side-stick control, and the first axis is the left-right axis of the side-stick control.

The first output may control aerodynamic control surfaces of the aircraft, and the second output controls wheel brakes of the aircraft.

The inceptor may be a side-stick control, and the first axis is the front-rear axis of the side-stick control.

The processing system may be configured to adopt the first state if the aircraft is airborne, and the second state only if the aircraft is on the ground.

The processing system may be configured to switch between states based on inputs indicating at least whether the aircraft is on the ground.

In a third state the processing system may be configured to control both the first output and the second output based on the first input.

The processing system may be configured to switch between states based on inputs indicating the aircraft groundspeed in relation to at least one predefined value.

The processing system state may be controlled by an input from an operator of the aircraft.

In the second state the movement resistance may include a stop to indicate a predefined angle of nose-wheel steering.

The inceptor may be a side-stick control; the first output may control aerodynamic control surfaces of the aircraft, and the second output controls nose-wheel steering of the aircraft, the first axis is the left-right axis of the side-stick input control; and in the first state the processing system may control a third output based on a second input, wherein the third output controls second aerodynamic control surfaces of the aircraft, and in the second state the processing system controls a fourth output based on the second input, wherein the fourth output controls wheel brakes of the aircraft, wherein the second input is the front-rear axis of the side-stick input control.

A movement characteristic of the inceptor may provide tactile feedback to the aircraft operator indicating the state of the processing system.

The control ratio provided by the processing system may vary dependent on the groundspeed of the aircraft.

The control ratio provided by the processing system may be variable, and the movement resistance is dependent on the active control ratio.

The control ratio provided by the processing system may vary dependent on position of the inceptor.

Movement stops may be provided between regions having different control ratios.

In a first region of movement of the inceptor an output may be proportional to inceptor position, and in a second region of movement the output is varied dependent on inceptor position in relation to a predetermined inceptor position, but wherein the output is not proportional to position.

The movement resistance may be dependent on at least the position of the inceptor.

The inceptor null may vary dependent on operator input.

The movement resistance may provide feedback to the operator to enable following a route.

There is also provided a method for controlling an aircraft, the method comprising the steps of at a processing system, receiving first input signals indicative of movement of an inceptor in a first axis; the processing system processing the first input signals; and while in a first state, outputting first output signals from the processing system to control only a first output based on the first input signals, and while in a second state outputting second output signals from the processing system to control only a second output based on the first input signals.

The inceptor may be an active inceptor device, the processing system being configured to control movement resistance of the inceptor, wherein the movement resistance is dependent on at least the state of the processing system.

The first output may control aerodynamic control surfaces of the aircraft, and the second output controls nose-wheel steering of the aircraft.

The processing system may be configured to adopt the first state while the aircraft is airborne, and the second state while the aircraft is on the ground.

The processing system may be configured to switch between states based on inputs indicating at least whether the aircraft is on the ground.

While in a third state, outputting control signals from the processing system to control first output and the second output based on the first input.

The method may further comprise receiving at least one input indicating the aircraft groundspeed, and varying the state dependent on the groundspeed in relation to at least one predefined value.

The method may further comprise receiving at least one input from an operator, and varying the state dependent on the input from the operator.

The method may further comprise the step of outputting instructions from the processing system to the active inceptor to define a stop within the range of movement of the active inceptor The method may further comprise the step of varying the control ratio of the processing system and the movement resistance of the active inceptor.

The control ratio may be is varied depending on the position of the active inceptor.

The method may further comprise the step of outputting instructions from the processing

BRIEF DESCRIPTION OF THE DRAWINGS

Embodiments of the invention will be described, by way of example, with reference to the following drawings, in which.

DETAILED DESCRIPTION

Figure 1:
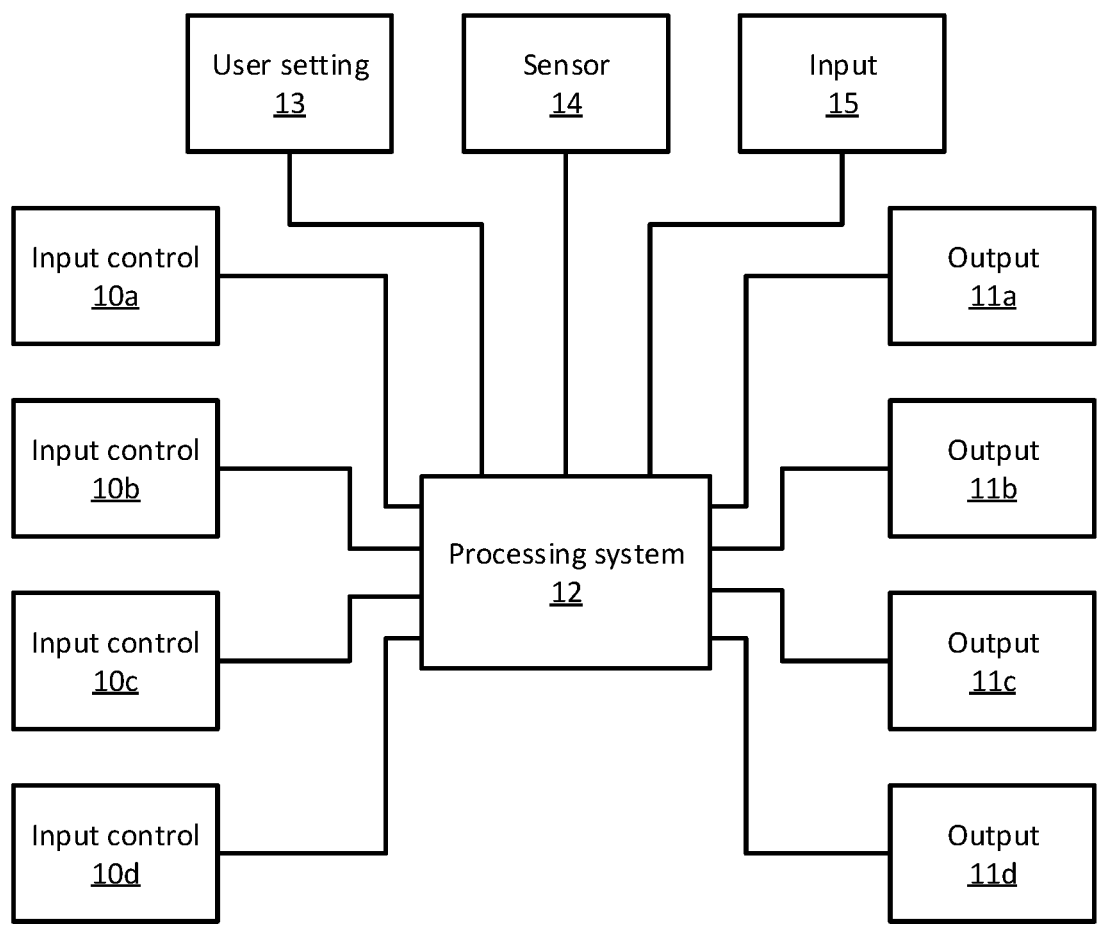
FIG. 1 shows a schematic diagram of an aircraft control system.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

FIG. 1 shows a schematic diagram of an aircraft control system, which shows only relevant parts of the system. Input controls 10a-10d represents inputs used by the operator, for example, side stick axes, throttle, rudder pedals, tiller, etc, which may be known generally as inceptors. Outputs 11a-11d represent the aircraft control devices, for example ailerons, elevators, engines, rudder, nose-wheel steering, and brakes. Processing system 12 receives signals from input controls 10a-10d, processes the signals, and outputs control signals to outputs 11a-11d. Processing system 12 may be a computer system connected to all relevant components and with programming to perform the required functions. The number of inputs and outputs is shown for example only.

Processing system 12 receives inputs from controls 10a-10d and activates outputs 11a-11d according to the processing system configuration. For example, the processing system may be configured to activate an aircraft's elevators in response to inputs from the forwards/backwards axis (often known as the pitch axis) of a side-stick. The relationship of control input to output is predefined and may be static or dynamic. The processing system 12 may be configured to vary the relationship of input to output based on user settings 13 or on sensors 14 from which inputs are received.

The processing system 12 defines a ratio or gearing between the inputs and outputs. That ratio defines how much movement or change in an output is provided by a given movement or change in the input.

For example, the input to output ratio for the elevators may be varied depending on the speed of the aircraft (typically the elevators will move less as speed increases for a given control input movement). Processing system 12 may also receive an indication of aircraft status, for example whether the aircraft is flying or in ground contact. Such indication may be derived from a variety of sensors associated with the aircraft (for example weight on wheels), or an input from an operator, such sensors and inputs being collectively represented as 15.

In a particular configuration, aircraft status may be utilised to change the outputs controlled by a particular input. That is, the function of an input is changed. For example, during flight the left/right side-stick axis (often known as the roll axis) may control the ailerons and hence roll of the aircraft, and when the aircraft is on the ground that side-stick axis may control the nose-wheel steering of the aircraft. Such a system recognises that certain outputs are only used in certain aircraft statuses. In this example the nose-wheel steering is only used while the aircraft is on the ground, and the ailerons are only used when the aircraft is in the air. These mutually exclusive outputs can therefore be mapped to a single control input as they will not be required at the same time.

Figure 2:
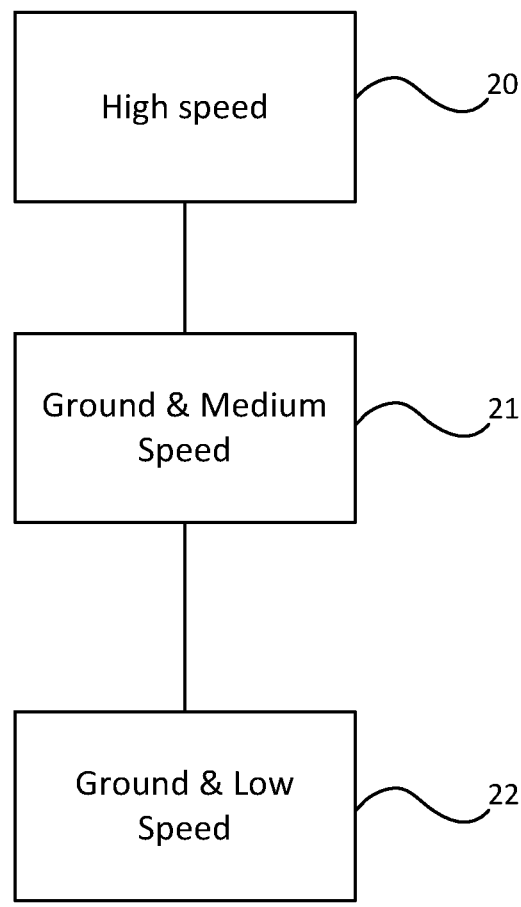
FIGS. 2 and 3 show control states.

Changing the function of an input may also be implemented where the outputs are not mutually exclusive but the desired output varies in a predictable manner. For example, the transition from aileron use to nose-wheel steering during landing may be a more gradual transition, as shown in FIG. 2. At step 20, during flight and at high groundspeeds only the ailerons are controlled by the side-stick. When the aircraft is on the ground and groundspeed drops below a first threshold at step 21, as indicated by sensors 15, processing system 12 modifies the control systems to control both the ailerons and nose-wheel steering. As groundspeed drops further, below a second threshold, at step 22 the processing system 12 controls only the nose-wheel steering.

The example of FIG. 2 shows two thresholds but any number of such thresholds maybe provided, or there may be a single transition threshold. Furthermore, transitions between phases may be continuous without defined thresholds. For example, as groundspeed decreases the control ratio of the nose-wheel steering may increase. That is, the amount of nose-wheel movement provided by a given side-stick movement increases as groundspeed decreases. Similarly, the control ratio of the ailerons may decrease as groundspeed decreases. The transitions between the modes of usage of the input may also have a discrete deadbanded threshold between them such that the control does not affect any output. For example as groundspeed decreases the input may switch off controlling ailerons and then as groundspeed further decreases in groundspeed occur the input may switch on control of the nose-wheel with a discrete deadband between the two groundspeeds.

In conventional aircraft control systems the nose-wheel steering is controlled by a tiller control. However, based on the above example in which both the ailerons and nose-wheel steering are controlled by the side-stick, the tiller control is not necessary, thus reducing the input control systems required.

Figure 3:
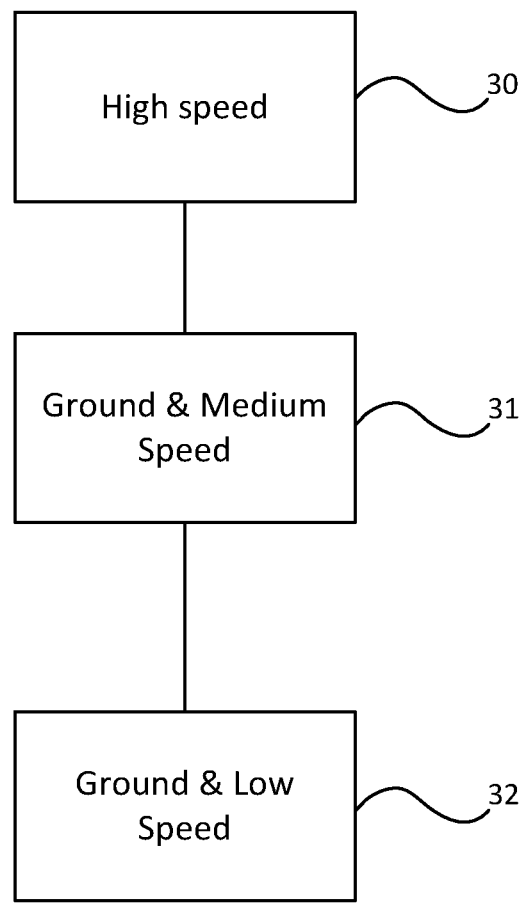

FIG. 3 shows an example of a shared control input for pitch control while in flight, and wheel brakes when on the ground. At step 30, during flight, the front/back axis of a side-stick controls the aircraft elevators and hence aircraft pitch. At step 31 the processing system 12 detects that the aircraft is on the ground, and modifies control systems to control both wheel brakes and elevators. At step 32, as groundspeed drops below a predefined threshold, only the wheel brakes are controlled. As set out above in conventional control systems wheel-brakes are controlled by brake pedals which may be regions of the rudder control pedals. However, in this example of shared control systems those control inputs are no longer necessary.

In the above examples the transition between control outputs may occur over relatively long periods in the context of the aircraft operation. For example, during a landing the transition from aileron to nose-wheel control may occur over substantially the full length of the landing run along the runway. Although this may only be in the order of seconds, it is not fast relative to the actions being conducted by the operator. The operator is therefore able to intuitively understand the change of control systems and modify their control inputs appropriately. Indicators may also be provided to indicate to the operator which mode the control system is in to provide further information to the operator.

Active stick technology may be utilised to improve the user experience when the control system outputs for a side-stick control vary. An active stick is a control stick input in which the resistance to movement can be varied dynamically. That is, the force required to move the stick can be controlled to provide different feels to the user. In a simple example the resistance throughout the stick's range of movement may be set to different levels. For example, three modes may be provided with different resistances to movement. In the examples of FIGS. 2 and 3 one mode may be utilised for each phase of the control system, thus providing tactile input to the operator as to which control outputs are being controlled.

The resistance of an active stick may also be varied throughout its range of movement to provide tactile feedback to the user as they move the stick. For example, it is possible to define "stops" within the range of movement which are regions of increased resistance through which it is harder to move the stick. The resistance may increase rapidly in relation to position such that the user feels as if the stick is against a limit of movement. The magnitude of the resistance may be varied to define how difficult it is move the stick through the stop region. Stops may be used in conjunction with variable control ratios to improve the tactile feedback and control system feedback to the user.

In a first example an active side-stick is configured to control both the aircraft roll while in the air, and the nose-wheel steering when on the ground. Control while in the air is according to standard control systems, with control changing to the nose-wheel once on the ground according to one of the above-mentioned processes. For example, control may switch between air and ground controls, or may gradually transition as described above.

In a first configuration for nose-wheel steering a stop and/or varying resistance is utilised to demark a change between control ratios. For small stick movements of +/−x° a first control ratio and first movement resistance may be provided. A stop may be provided at x° of stick movement to indicate the end of the first ratio has been reached. The magnitude of the stop may be such that the stick can be moved through without significant effort, but sufficient to be noticeable by the operator. Above x° of stick movement the movement resistance may be changed (for example increased or decreased compared to the first movement resistance, but in any event decreased compared to the stop resistance) for greater stick movements. Above x° the control ratio changes to a second control ratio. The stop and/or change from first to second movement resistance indicates to the operator that the control system has changed. In an example x may be 10°. For stick movements of less than ten degrees the first control ratio may be 1:1 such that 10° of stick movement delivers 10° of nose wheel steering. Above 10° of stick movement the second control ratio may be greater such that 10 to (maximum stick movement—for example 20°)° of stick movement provides 10-(maximum steering angle—for example 78°)° of nose wheel steering. The ratio therefore increases for greater stick deflections.

In a second configuration +/−x° of stick movement (for example 10°) provides a first ratio of nose-wheel steering (for example, 1:1) and has a first movement resistance, such that at x° of stick movement the steering angle is initially y°. A stop may be provided at x° of stick movement. Moving the stick greater than x° increases the steering angle, and holding the stick at x° then maintains the current steering angle (including if greater than y°). Moving the stick to less than x° reduces the steering angle if that angle is greater y°. Once at y° control reverts to the first ratio for movements less than x° such that steering angle is proportional to stick position. That is, once a steering angle of y° is achieved the side-stick may provide a non-proportional response whereby movements of the stick indicate a change in output rather than a particular requested output. In this example, rather than a stop at x° a null may be provided such that the stick remains in that location when pressure is removed such that the stick feels centred at that location. This provides tactile feedback to the user to understand the current configuration.

In a third configuration, the movement resistance may be set dependent on nose-wheel steering angle. For example, a resistance +/−z lbf may be set per degree of nose-wheel steering. Furthermore, the relationship may be non-linear to allow larger nose-wheel steering movements than stick movements. For example, a set of coordinates may be defined as ((lbf), (stick movement)) as (0,0), (5,10), (10,15), (40,20).

In a fourth configuration, the stick null may be moved in the opposite direction to stick movement. When released the stick moves back to the null position (which is no longer at the geometric centre of stick movement), and the steering remains at the set position. For example, 10 lbf of force to the right may move the steering to 20° to the right. Upon release the null has moved to the left of the geometric centre.

The above configurations are not intended to be construed as discrete examples, but rather as possible combinations of features. Aspects from each configuration may be used in combination with aspects of other configurations as appropriate or desired.

Comparable configurations may be used for other control systems, for example control of wheel brakes by an active side-stick. Non-linear gradients may be utilised for brake control such that the control ratio increases with stick movement. Such varying ratios may allow more graceful, finely controlled, braking on long runways and more aggressive braking on shorter runways.

The processing system 12 may receive inputs from other aircraft systems which are used to define active stick behaviour. For example, stick behaviour may be modified to assist following intended routes on the ground (e.g. following taxiways). For example, stick resistance may increase (for example a stop may be defined) if the operator instructs a movement which would move the aircraft away from a defined route of travel to indicate to the operator their input may be incorrect. However, side-stick movement through the stop is possible such that the operator can override the control system's suggestion. A further example may be modified braking behaviour as the aircraft approaches a turn or stop point to suggest control inputs to the pilot.

The above description has been given primarily in relation to a side-stick control, but as will be appreciated the principles discussed apply to any type or configuration of inceptor. In particular the functionality of a side-stick and yoke may be comparable and references to a side-stick should be construed as references to a control input of that type regardless of its position relative to an operator or how it is gripped.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A control system for controlling an aircraft, the system comprising;
    an inceptor; and
    a processing system having a processing system input configured to, in response to the inceptor being active, receive inputs indicative of movement of the inceptor in an axis and configured to dynamically vary movement resistance of the inceptor, and at least first and second outputs, each output for controlling different aspects of the aircraft;
    wherein, in a first state, the processing system is configured to control the first output based on one or more inputs received at the processing system input, and in a second state the processing system is configured to control the second output based on the one or more inputs received at the processing system input, and wherein the dynamically varied movement resistance is based on at least the first and second states.

2. The control system according to claim 1, wherein the first output controls aerodynamic control surfaces of the aircraft, and the second output controls nose-wheel steering of the aircraft.

3. The control system according to claim 2, wherein the inceptor is a side-stick control, and the axis is a left-right axis of the side-stick control.

4. The control system according to claim 2, wherein the processing system is configured to adopt the first state if the aircraft is airborne, and the second state only if the aircraft is on the ground.

5. The control system according to claim 1, wherein the first output controls aerodynamic control surfaces of the aircraft, and the second output controls wheel brakes of the aircraft.

6. The control system according to claim 1, wherein the processing system is configured to switch between states based on one or more inputs indicating at least whether the aircraft is on the ground.

7. The control system according to any claim 1, wherein in a third state, the processing system is configured to control both the first output and the second output based on one or more inputs received at the processing system input.

8. The control system according to claim 1, wherein the first output controls aerodynamic control surfaces of the aircraft, and the second output controls nose-wheel steering of the aircraft, and wherein in the second state the movement resistance includes a stop to indicate a predefined angle of nose-wheel steering.

9. The control system according to claim 1, wherein the processing system input is a first processing system input, and the axis is a first axis, and wherein:
    the processing system has a second processing system input configured to receive inputs indicative of movement of the inceptor in a second axis;
    the inceptor is a side-stick control;
    the first output controls aerodynamic control surfaces of the aircraft, and the second output controls nose-wheel steering of the aircraft, and the first axis is a left-right axis of the side-stick control; and
    in the first state the processing system controls a third output based on one or more inputs received at a second processing system input, wherein the third output controls second aerodynamic control surfaces of the aircraft, and in the second state the processing system controls a fourth output based on one or more inputs received at the second processing system input, wherein the fourth output controls wheel brakes of the aircraft, wherein the second axis is a front-rear axis of the side-stick control.

10. The control system according to claim 1, wherein a control ratio provided by the processing system varies dependent on the groundspeed of the aircraft.

11. The control system according to claim 1, wherein a control ratio provided by the processing system varies dependent on position of the inceptor.

12. The control system according to claim 1, wherein in a first region of movement of the inceptor an output is proportional to inceptor position, and in a second region of movement the output is varied dependent on inceptor position in relation to a predetermined inceptor position, but wherein the output is not proportional to position.

13. The control system according to claim 1, wherein the movement resistance is dependent on at least the position of the inceptor.

14. The control system according to claim 1, wherein a null position of the inceptor varies dependent on operator input.

15. The control system according to claim 1, wherein the movement resistance provides feedback to the operator is based on movement of the aircraft away from a defined route.

16. A method for controlling an aircraft, the method comprising:

receiving, at a processing system, input signals indicative of movement of an inceptor in a first axis;

processing, at the processing system, the input signals;

outputting, from the processing system and while in a first state, first output signals to control a first output based on the input signals;

outputting, at the processing system and while in a second state, second output signals to control a second output based on the input signals; and dynamically varying, by the processing system, movement resistance of the inceptor based on at least the first and second states.

17. The method according to claim 16, wherein the first output controls aerodynamic control surfaces of the aircraft, and the second output controls nose-wheel steering of the aircraft.

18. The method according to claim 16, wherein the processing system is configured to adopt the first state while the aircraft is airborne, and the second state while the aircraft is on the ground.

19. The method according to claim 16, wherein the movement resistance provides feedback to the operator is based on movement of the aircraft away from a defined route.

* * * * *